(12) United States Patent
Smith

(10) Patent No.: US 8,849,683 B2
(45) Date of Patent: *Sep. 30, 2014

(54) RECEIPT INSURANCE SYSTEMS AND METHODS

(71) Applicant: Victor T. Smith, Cleveland, OH (US)

(72) Inventor: Victor T. Smith, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/053,844

(22) Filed: Oct. 15, 2013

(65) Prior Publication Data

US 2014/0039940 A1 Feb. 6, 2014

Related U.S. Application Data

(63) Continuation of application No. 13/344,820, filed on Jan. 6, 2012, now Pat. No. 8,560,353, which is a continuation-in-part of application No. 12/822,495, filed on Jun. 24, 2010, now Pat. No. 8,234,133.

(60) Provisional application No. 61/220,309, filed on Jun. 25, 2009.

(51) Int. Cl.
| | |
|---|---|
| *G06Q 40/00* | (2012.01) |
| *G06Q 30/02* | (2012.01) |
| *G06Q 20/20* | (2012.01) |
| *G06Q 40/08* | (2012.01) |

(52) U.S. Cl.
CPC ............... *G06Q 40/00* (2013.01); *G06Q 30/02* (2013.01); *G06Q 20/204* (2013.01); *G06Q 40/08* (2013.01)
USPC ................................................. 705/4; 705/35

(58) Field of Classification Search
CPC ........ G06Q 40/00; G06Q 40/08; G06Q 30/02
USPC ........................................................ 705/4, 35
See application file for complete search history.

(56) References Cited

U.S. PATENT DOCUMENTS

| | | | | |
|---|---|---|---|---|
| 6,341,353 | B1 * | 1/2002 | Herman et al. | 726/5 |
| 6,738,749 | B1 * | 5/2004 | Chasko | 705/17 |
| 7,269,733 | B1 * | 9/2007 | O'Toole, Jr. | 713/175 |
| 7,487,912 | B2 * | 2/2009 | Seifert et al. | 235/380 |
| 7,729,930 | B1 * | 6/2010 | Bohanek | 705/4 |

(Continued)

OTHER PUBLICATIONS

Wagstaff, J. (May 5, 2006). Weekend Journal; pursuits—loose wire: A home for stray receipts; retrieving proof of your purchases can be hellish—but it needn't be. The Wall Street Journal Asia Retrieved May 22, 2014.*

(Continued)

*Primary Examiner* — Kito R Robinson
(74) *Attorney, Agent, or Firm* — Black, McCuskey, Souers & Arbaugh, LPA

(57) ABSTRACT

Receipt insurance systems and methods provide protection to consumers against losses which may result from failure to possess a physical receipt or proof of purchase for retail purchase transactions. In one embodiment, a third party receipt insurer insures or guarantees consumers or purchasers of benefits associated with having possession of a receipt or other proof of purchase for a retail purchase without the need for possession of a physical or paper receipt. A receipt insurance agreement between a receipt insurance provider and a consumer protects the consumer against a loss of consumer rights or personal property insurance rights resulting from a lost receipt by electronically storing for retrieval, if necessary, an electronic record of all of the receipt information.

6 Claims, 8 Drawing Sheets

(56) References Cited

U.S. PATENT DOCUMENTS

| | | | |
|---|---|---|---|
| 7,896,242 B2* | 3/2011 | Rothschild | 235/383 |
| 7,941,330 B1* | 5/2011 | Buentello et al. | 705/4 |
| 8,355,932 B2* | 1/2013 | Malackowski et al. | 705/4 |
| 2001/0029484 A1* | 10/2001 | Schultz et al. | 705/39 |
| 2002/0165741 A1* | 11/2002 | Becker et al. | 705/4 |
| 2003/0061104 A1* | 3/2003 | Thomson et al. | 705/26 |
| 2006/0106650 A1* | 5/2006 | Bush | 705/4 |
| 2007/0069013 A1* | 3/2007 | Seifert et al. | 235/383 |
| 2007/0094087 A1* | 4/2007 | Mitchell et al. | 705/22 |
| 2008/0028473 A1* | 1/2008 | Cehelnik | 726/27 |
| 2009/0164344 A1* | 6/2009 | Shiftan et al. | 705/28 |
| 2010/0100434 A1* | 4/2010 | Sock | 705/14.38 |
| 2010/0241463 A1* | 9/2010 | Corben et al. | 705/4 |

OTHER PUBLICATIONS

Stock, H. (Mar. 28, 2000). Not all are sold on web point of sale terminals. American Banker Retrieved May 22, 2014.*

* cited by examiner

Choose Payment Option

Credit Card card type: [Select card type]

card number: [_____] (omit dashes or spaces)

security code: [____] what is this?

expiration date: [12] [2009]

☐ Check this box if you would like us to save your credit card information.

( Receipt Insurance ) ○ Yes ○ No

What's this?

( purchase )

Fig. 6

| Home | Manage Accounts | Pay Bills | Transfers | Service Center | Manage Features |
| Account History | Online Statements | Image Search | | | |

Account History

Checking

Account Summary
| | | | | |
|---|---|---|---|---|
| AvailableBalance : | $144.00 | | | |
| Last Statement Balance: | $1,711.00 | | | |
| Last Deposit Amount: | $880.00 | From | To | Or |
| Last Statement Date: | 11/14/2010 | 12/05/2010 | 12/11/2010 | Select... |
| Last Deposit Date: | 12/05/2010 | Type | | |
| Last ActivityDate: | 12/06/2010 | All Transactions | | VIEW |

Transaction History

| Date | Description | Ref. # | Debit(-) | Credit(+) | Balance | Receipt Insured |
|---|---|---|---|---|---|---|
| 12/11/2010 | Preauthorized Debit | | $1,286.00 | | $144.00 | |
| 12/06/2010 | Check | 2223 | $200.00 | | $1,430.00 | |
| 12/05/2010 | ATM Cash | | $140.00 | | $1,630.00 | RI |
| 12/05/2010 | Preauthorized Debit Memo: ONLINE PMT | | $146.00 | | $1,770.00 | |
| 12/05/2010 | ATM Deposit | | | $880.00 | $1,916.00 | |
| 12/03/2010 | DBT Purchase | | $24.00 | | $1,036.00 | RI |
| 12/03/2010 | DBT Purchase | | $30.00 | | $1,060.00 | RI |
| 12/03/2010 | DBT Purchase | | $36.00 | | $1,090.00 | RI |
| 12/03/2010 | DBT Purchase | | $39.00 | | $1,126.00 | |
| 12/03/2010 | DBT Purchase | | $151.00 | | $1,165.00 | RI |
| 12/05/2010 | ATM Cash | | $140.00 | | $1,316.00 | |

Fig. 8

RECEIPT INSURANCE SYSTEMS AND METHODS

RELATED APPLICATIONS

This application is a continuation of U.S. patent application Ser. No. 13/344,820 filed Jan. 6, 2010 (U.S. Pat. No. 8,560,353) which is a continuation-in-part of U.S. patent application Ser. No. 12/822,495, filed Jun. 24, 2010 (U.S. Pat. No. 8,234,133) which claims priority to U.S. Provisional Patent Application No. 61/220,309, filed on Jun. 25, 2009, which applications are fully incorporated herein.

FIELD OF THE INVENTION

The present invention is in the general field of commercial sales transactions and insurance, and more particularly in the field of sales transaction records and management, verification and insurance.

BACKGROUND OF THE INVENTION

Paper receipts have long served as the sole record of sales transactions, particularly consumer sales transactions, and the sole bearer paper for proof of purchase and claim of rights, primarily ownership rights, associated with the purchase. A receipt may contain such information as identification of items purchased, quantity of items purchased, date and time of purchase, location of purchase, total transaction amount including taxes, discounts and other adjustments and payment method, and other information in coded or other form which assists the seller in identifying each transaction uniquely. A receipt may also contain a message from the retailer, warranty or return details, special offers, advertisements or coupons. Typically, for in-store purchases/sales, a receipt is generated from the retail point of sale system on paper register tape and presented to the buyer at the completion of the transaction. For online purchases, a receipt may be electronically generated at the end of the transaction or immediately e-mailed to the buyer so the buyer can print the receipt information from his/her home computer, or a paper receipt and/or packing slip may be contained in the package when the merchandise is delivered to the buyer. In most cases, a paper receipt or copy thereof is generated. Even when an electronic receipt is generated, the buyer must print a copy of the receipt in order to obtain any rights associated with the transaction, such as a return or warranty claim, or insurance claims for loss or destruction of an item of personal property.

A receipt is also a legal document which serves as evidence of a transaction between a seller and a buyer, and proof of ownership as a result of purchase. Possession of a receipt entitles the bearer to certain rights. Retailers may require consumers, as part of the terms and conditions of a sale, to present an original receipt document as proof of purchase of an item in order for the consumer to return or exchange the item. Similarly, a manufacturer of a product may require presentation of an original receipt document as a pre-condition to any claim made for warranty replacement or repair of an item. The submission of an original receipt may also be required by, among others, employers for reimbursement of business-related purchases; personal property insurers for claims of lost, damaged or stolen property, insurance providers for reimbursement of certain health-related expenses; the federal government for income tax records, and U.S. courts of law for legal related matters as a business document under the Federal Rules of Evidence.

Given the legal and transactional importance of possession and safe-keeping of sales receipts, significant attention and effort must be devoted to maintaining possession, control, organization and protection of receipts in physical form, i.e. paper receipts. The time period between when a purchase is made and when a receipt is required can be several years for returns and warranty claims, and for the entire period of ownership for personal property loss claims. Even if a consumer manages to retain the receipt, over time the receipt may become illegible or otherwise damaged to the point where it becomes void and is no longer functional as a legal document. Some receipt printing technology such as thermal printing does not produce print which remains legible over an extended period of time. Loss of a receipt results in loss of the consumer's rights, and can reflect negatively on the seller or retailer that refuses to honor returns or warranty claims solely due to the absence of a receipt.

Paper receipt generation for every retail transaction is also an enormous burden for retailers and on the environment. In addition to the equipment and labor required to continuously generate millions of paper receipts, the physical paper requirements for receipts just in the U.S. is estimated to be in the hundreds of thousands of tons, sourced from the annual destruction of thousands of trees.

Systems for generating and storing receipt data electronically, i.e., electronic receipts, are known. They involve interfacing with retailer point-of-purchase (POP) systems to acquire receipt information and store it either on-site or off-site or by a third-party provider. For example, published U.S. patent application US2009/0271322A1 discloses a system and method for auto-generating an electronic receipt from a point-of-sale (POS) with a credit card terminal and/or electronic cash register, and which de-activates normal receipt printing functionality, captures electronic receipt information and transmits it to a membership or subscriber based Internet website where consumers may view and manage their receipt information. The system also includes a membership or provider based Internet website for merchants to view and manage information related to previous customers, from which merchants may distribute coupons or advertisements to participating consumers.

Published U.S. patent application US2009/0313132A1 discloses a receipt store as a cloud computing service wherein electronic receipt data is associated with customer information and sent to the cloud by the retailer. The customer information can be provided via a device such as a cell phone or other device containing an electronic record which is read at the point of sale. The receipt data can then be accessed by the customer by the device or other computing means.

Published U.S. patent application US2009/0216664A1 discloses the use of a portable device for electronic payment with a base device of a retailer, and receiving and storing an electronic receipt.

U.S. Pat. No. 7,552,087 discloses an electronic transaction receipt system and method wherein electronic receipts are issued to buyers via the Internet, and may include hyperlinks to related information such as product return procedures, product warranty information, rebates or recall procedures.

Published U.S. patent application US2008/0313066A1 discloses a method and system for managing receipts wherein electronic copies of receipts are generated and stored in a database under unique identification codes for each purchaser/user for later access if needed. The application includes disclosure of the seller generating electronic receipt data which is assigned a unique code and stored in a database, but does not address seller or retailer acceptance of electronic receipt records for purposes of merchandise return, refund, exchange or warranty claims.

Published U.S. patent application US2008/002473A1 discloses a method of retaining and accessing receipts in which digitized receipt data is transferred from the retailer point-of-sale to a receipt service provider (RSP) which is accessible by consumers via a website by use of a PIN code.

Published U.S. patent application US2007/0205274A1 discloses a method and program for generating an electronic receipt of a sales transaction at appoint of purchase and transmitting the record in an electron form for retrieval by the buyer. The receipt record may be transmitted to a portable memory storage device in possession of the buyer at the point of purchase, or to a remote service provider or to an Internet address accessible by the buyer.

Published U.S. patent application US2007/0164106A1 discloses an online receipt management system in which a centralized online electronic receipt database is accessible to users via the Internet using a password or e-mail address to access an individual account.

Published U.S. patent application US2007/0094088A1 discloses a system and method of providing electronic receipts directly to a customer wherein biometric data and product specific identification information is collected with each purchase and included with an electronic receipt generated for each purchase.

Published U.S. patent application US2007/0050258A1 discloses a receipt card system that allows consumers to view stored transaction line-item detail using a web browser interface, and to download the information into personal financial management system.

Published U.S. patent application US2007/0045405A1 discloses a system and method for issuing digital receipts for purchase transactions wherein electronic receipt data is transmitted, for example by e-mail, to the owner of a credit card which is used for the purchase.

Published U.S. patent application US2007/0005510A1 discloses a system and method wherein receipt data in electronic form is made available to consumers at the point-of-sale such as for example by use of USB device in connection with an electronic cash register.

U.S. Pat. No. 7,069,240 discloses a system for image capture of receipt data for expense reports, which analyzes images of receipts, converts images to text, extracts expense data and creates an expense report with the receipt data.

Published U.S. patent application US2005/0060437A1 discloses an electronic receipt management system which stores electronic receipt data from multiple disparate retailers and associates receipt data with a unique identifier by vendor or transaction in a storage device, which may be a portable or personal digital storage device such as a personal digital assistant, cell phone or handheld computer.

Published U.S. patent application US2004/0220964A1 discloses a method and apparatus for management of electronic receipts on portable devices wherein the consumer uses the portable device to conduct the transaction with a base device such as an electronic cash register.

U.S. Pat. No. 6,543,683 discloses a system and method for providing a consumer means to access a digital receipt generated from a purchase transaction and stored in a storage device, and to access various application, features or functions related to a stored digital receipt.

Published U.S. patent application US2002/-188559A1 discloses a digital receipt personal identification system in which digital receipts are uniquely coded so that a buyer can later access an electronic version of sales receipt through a computing device by presenting the transaction identifier.

U.S. Pat. No. 6,487,540 discloses a system and method for electronic receipt transmission and management which include itemized purchase transaction information and use wireless vendor devices and wireless purchase devices to transmit and receive electronic receipts at the point-of-sale, and wherein the wireless purchaser device also performs short range and long range communications for purchase authorization to complete a purchase from a vendor.

U.S. Pat. No. 6,341,353 discloses a smart receipt electronic receipt system that provides intelligent receipts that electronically document a transaction and maintain a persistent connection between the seller and the buyer, including hyperlinks in the smart receipt which enable the buyer to access customer service and order status.

U.S. Pat. No. 5,739,512 discloses a system that stores or transmits receipt information digitally, over the Internet or to an e-mail address, and discloses embedding an e-mail address into a bank card such as a credit card.

U.S. Pat. No. 7,324,952 discloses an insurance and transaction monitoring method and system which uses a transaction monitoring program which records details of and communications concerning an insurance contract for increased security and information accuracy.

U.S. Pat. No. 7,246,068 discloses a computerized system for combining insurance company and credit card transactions wherein consumer use of a credit card generates rebates or rewards which may be used to offset the cost of an insurance policy or to make payments to a medical services account.

Although these patents and patent applications disclose various systems and methods for creating and accessing electronic receipts, they do not address or remedy or cover consumer losses resulting from the loss of receipts, whether in paper or electronic form.

Published U.S. patent application US2009/0157437A1 discloses systems and methods for providing insurance and non-insurance products wherein insurance coverage for loss or breakage of a purchased product is included in the sale of a service contract for the product.

Published U.S. patent application US2009/0182584A1 discloses methods for selling insurance using a rapid decision term, by which an insurer sells a life insurance policy with a defined first term and at a first premium which may be relatively high and limited underwriting, and which may be reduced if the insured provides additional information such as medical information and such information indicates a reduced premium is appropriate.

Published U.S. patent application US2010/0114612A1 discloses systems and methods for providing supplemental insurance for leased vehicles wherein a supplemental insurance coverage decision is made by an insurer based upon information received via computer from a leasing dealer or agent. The system is also configured to process claims for the supplemental insurance coverage.

Although these patents and patent applications disclose various systems and methods of implementing and transacting different types of insurance policies and business, they do not address insurance coverage for consumers related to losses which could result from the absence or loss of a paper receipt or electronic receipt for the purchase of a product. The prior art does not provide any system or method for coverage of consumer losses or loss of rights with respect the ownership of a product or personal property which could result from the loss of a paper or electronic receipt.

SUMMARY OF THE INVENTION

The present disclosure and related inventions provides receipt insurance systems and methods by which consumers rights attendant to the possession of a physical printed receipt for merchandise or service are insured by a third party insurer, regardless of the existence or possession of a physical printed receipt from a seller or retailer. A receipt insurer functions as a third party insurer who protects the consumer against any loss of rights with respect to a purchase which may otherwise result from the absence of a printed paper receipt. The receipt insurance systems and methods of the disclosure and related inventions can be acquired per transaction, or in connection with a payment system such as a credit or debit card. The receipt insurance systems and methods are configured for creating, storing and retrieving electronic records of sales transactions which are verified, certified and accepted by sellers such as retailers as valid and authentic proof of purchase of an item and of all of the related sales transaction information. In preferred embodiments of the disclosed systems and methods, paperless receipt records are provided as part of a receipt insurance service wherein a purchaser is insured to have and retain all of the benefits attendant to the sales transaction, but without the physical (paper) existence of or physical possession of a paper receipt.

In accordance with the disclosure and related inventions, a third party provider of receipt insurance, a receipt insurer, enters into agreements with sellers such as retailers, and with consumers, under which the consumer is insured against any losses or loss of rights which could occur as a result of not having a paper receipt for an item purchased by the consumer from a seller, and under which the retailer agrees to accept the receipt insurer's electronic record of an insured purchase transaction. Once the receipt insurance agreements are in place, the receipt insurer receives receipt data from a retailer, or from a retailer service provider such as merchant payment services or a credit card issuer, for each insured transaction for which Receipt Insurance is provided. The Receipt Insurance provider maintains a database of all of the receipt information for receipts which are insured, and is able to retrieve receipt information upon request of the consumer or retailer for an authenticated or certified receipt in lieu of an original paper receipt. Further, in accordance with the disclosed methods of the invention, the Receipt Insurance service may be provided as part of individual retail consumer sales transactions in stores or online (e-commerce), as part of a payment services agreement such as debit or credit cards issued by a financial institution, or on a per transaction basis, regardless of the location or type of transaction.

In accordance with another aspect of the present disclosure and related inventions, a method for providing receipt insurance from a receipt insurer to purchasers of goods for financial protection against losses which could result from a purchaser's failure to possess an original sales receipt received from a seller in connection with a purchase of goods or services, and by agreements with the purchasers and sellers of goods or services and implementation and operation of a receipt insurance system by the receipt insurer, the method including the steps of: the receipt insurer offering receipt insurance coverage to a purchaser in the form of an agreement presented to the purchaser under which the purchaser is provided assurance that a seller of goods will accept an electronic record of a receipt from the receipt insurer as proof of purchase of goods specified by the electronic record of a receipt, and further that if a seller does not accept an electronic record of a receipt as proof of purchase of goods specified by the electronic record of the receipt the receipt insurer will compensate the purchaser for an amount of specified losses resulting from a seller's refusal to accept an electronic record of a receipt from the receipt insurer as proof of purchase of the goods specified by the electronic record of the receipt; the receipt insurer entering into agreements with sellers of goods by which the sellers agree to accept an electronic record of a receipt as proof of purchase of goods specified by the electronic record of a receipt; the receipt insurer establishing and operating a receipt insurance system by which receipt data for purchasers who have accepted receipt insurance coverage is acquired from sellers who have agreed to accept electronic records of receipts as proof of purchase of goods specified by electronic records of receipts, the receipt insurer storing electronic records of receipts in the receipt insurance system; the receipt insurer receiving claims from purchasers for electronic records of receipts and delivering electronic records of receipts to purchasers or sellers upon request, and the receipt insurer paying any receipt insurance claims which are covered by the receipt insurance agreements.

These and other concepts, features aspects and innovations of the disclosure and related inventions are further described herein and with reference to the accompanying Figures where necessary.

DESCRIPTION OF THE FIGURES

FIG. 6 is a representative screen display of a internet website page for a purchase transaction which includes receipt insurance as a component of the purchase transaction;

FIG. 8 is a representative layout and view of an account statement which can be displayed as a page on a computer display.

DETAILED DESCRIPTION OF PREFERRED AND ALTERNATE EMBODIMENTS

Figure 1:
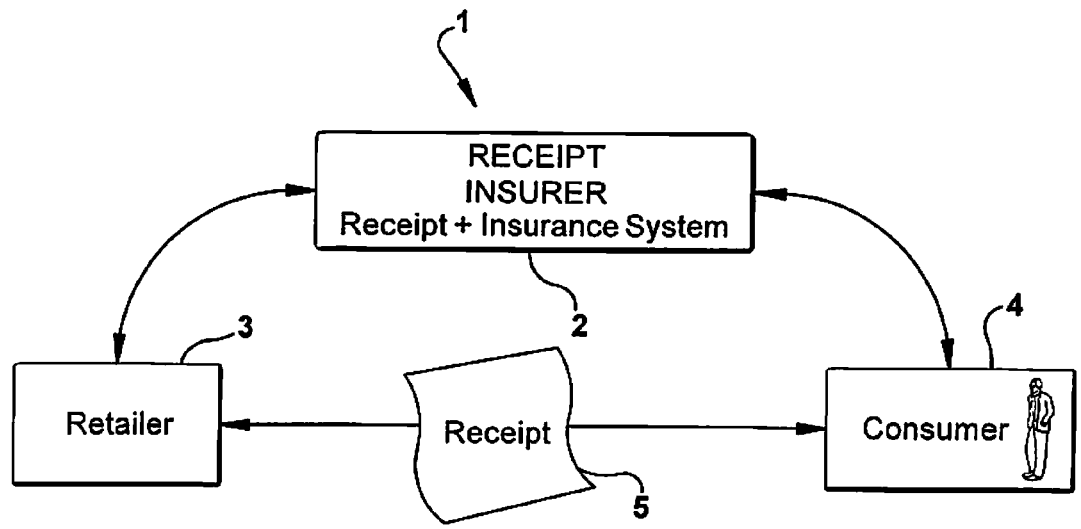
FIG. 1 is a schematic diagram of the receipt insurance system and method of the present disclosure.

In accordance with the present disclosure, various embodiments of systems and methods for receipt insurance, consumers are insured against loss of rights resulting from the loss of a physical paper receipt associated with a sales transaction. The receipt insurance systems and methods of the invention insure consumers against losses resulting from the absence of a paper receipt by agreements with sellers/retailers to obtain electronic transaction data, and to produce certified or otherwise verified electronic receipt records in lieu of paper receipts if needed for such receipt benefits as returns, replacements or warranty claims or personal property insurance claims. The receipt insurer may further provide consumers with insurance coverage against losses of any kind arising from the loss of a paper receipt.

As disclosed herein in the various alternate embodiments, in a receipt insurance system and method a consumer, for example at the point of sale or in connection with a payment system, may choose to purchase or otherwise acquire insurance coverage from a receipt insurer to insure and protect all of the benefits of ownership of an item of merchandise (or performance of a service) without the need for the physical existence or preservation of a physical receipt. A third party receipt insurer receives an electronic record of a sales transaction from the seller, such as a retailer, and stores it in a database as a uniquely identified sales transaction record or "electronic receipt" associated with an insured purchaser, buyer or consumer. The seller or retailer also participates in or consents to the receipt insurance system and method, and cooperates with the necessary transfer of information from each transaction for operation of the system and method. The electronic record of the transaction or "electronic receipt" for a receipt-insured sales transaction is transmitted to and saved within the receipt insurance system, which includes a working combination of hardware, software and data communications devices which are configured and programmed for storage and retrieval of electronic receipt records as electronic digital data. In certain embodiments, the receipt insurance system works in combination with retail Point of Sale (POS) and/or Enterprise Resource Planning (ERP) systems to capture consumer sales transaction data so that retailers may provide receiptless transactions to consumers in connection with the receipt insurance coverage.

In addition, the systems and methods disclosed herein may be implemented in various configurations and manners. The particular embodiments and implementations disclosed herein are illustrative of the various aspects of the disclosure and related inventions and best modes and do not otherwise limit the scope of the disclosure and inventions in any way. The described systems and methods may be embodied as a data processing and storage system, including devices for data processing, storage and retrieval as accomplished by computer hardware and software configured and programmed to carry out the described functions and operations. Some embodiments of the invention may be in the form of a computer program on a computer-readable storage medium having computer-readable program code embodied in the storage medium. Any suitable computer-readable storage medium may be utilized, e.g. hard disks, CD-ROM, optical storage devices, magnetic or the like. Conventional data networking, application development and other functional aspects of the systems are not described in detail herein. Connecting lines in the various diagrams and figures are intended to represent exemplary system relationships or physical connections which may be present in an information technology implementation of the system and in order to carry out the various steps of the method.

The terms "retailer" and "seller" may be used interchangeably throughout this disclosure and generally refer to and mean the seller or merchandise, products, goods or services and issuers of a receipt, in paper or electronic form, to a buyer as a record of a sales transaction with a buyer, and further includes retail store operators "retailers" and Internet websites which present merchandise, products, goods or services for sale and are configured for selection, purchase, payment and delivery of products to a buyer who accesses the website over the Internet. Similarly, the terms "customer", "consumer", "buyer" and "user" are also used interchangeably herein and refer to generally and mean and include individuals, persons, entities or organizations that pay money in exchange for merchandise, products, goods or services. The terms "insurance" and "receipt insurance" and "Receipt Insurance" mean and include any business or contractual agreement (also referred to herein as a "policy", "coverage" or "agreement") whereby a consumer is provided with some assurance, coverage, guarantee or promise which addresses any disadvantages to the consumer which might arise as a result of not having in his or her possession either a physical (e.g. paper) receipt or an electronic record of a receipt for a purchase transaction. Also, as used herein the term "receipt insurance" does not require there to be an actual insurance policy or agreement between a consumer and an insurer, payment systems provider or other party, and may consist simply of a term or condition of a sales transaction, either with or between a consumer, a retailer or merchant, a payment systems provider, and/or third party such as a guarantor. The terms "insurance" and "assurance" are synonymous herein. The terms "seller", "retailer" and "vendor" are used synonymously herein. The terms "agreement" and "policy" are used synonymously herein.

The receipt insurance systems and methods disclosed herein provide consumers with a new and valuable insurance product. Consumers are insured, by a third party insurer, that they will receive all of the benefits that exist with physical possession of a paper receipt, without the continuous burden of maintaining physical custody of the receipt. Product returns, exchanges, repair, replacement and other purchase and warranty or insurance coverage benefits are insured by the receipt insurance coverage which is provided to the consumer by the receipt insurer. The receipt insurance agreements eliminate the need for the receipt insured buyer to physically possess either an original paper receipt or an electronic record of a receipt. Furthermore, a receipt insurance policy or agreement may protect a consumer against any and all losses resulting from failure to possess a physical paper receipt, even if due to a retailer's or vendor's rejection or non-acceptance of an electronic receipt record, or the receipt insurer's loss of a digital receipt record.

Receipt insurance also benefits retailers because the significant business costs and complexity of generating paper receipts is largely reduced or eliminated. Not only is this cost reduced, but a new revenue source may be provided by a portion of the fees charged to consumers for the receipt insurance services of electronic receipt creation and retrieval. Receipt insurance also benefits retailers by remotely storing customer receipt information so that it can easily be accessed by the retailer during returns, exchanges and/or warranty claims. This removes the burden from the retailer of having to store customer receipt data, even if for a short period of time, or having a backup version for reference. Many retailers currently offer receiptless returns or exchanges, but most often this is only for a limited amount of time or only for purchase under a specified amount. If a product needs to be returned or warranty benefits honored six months to one year or more after purchase, many retailers require a paper receipt as proof of purchase because the electronic records of the transaction no longer exist. Providing receipt insurance to consumers also provides an incentive for consumers to purchase from participating retailers who accept receipt-insured electronic receipt records.

In addition, as further described, the receipt insurance systems and methods of the present disclosure and related inventions enable a new form of fee-generating business, i.e., a new type of insurance against loss. The receipt insurance fees or premiums can be collected by several different routes and methods in accordance with the disclosure. Most directly, consumers wishing to obtain insurance coverage on one or more receipts, i.e., on the legal and economic benefits of having a permanent electronic record of a purchase transaction, can pay for such coverage on a per transaction basis. Alternatively, retailers, product manufacturers or other sellers may provide receipt insurance or receipt assurance at their expense, or under certain conditions such as purchases over a certain amount. Or a payment systems provider, such as a credit card issuer or debit card issuer may provide or pay the premium for the receipt insurance coverage for card holders for some or all transactions, all as further disclosed and described herein. For example, a credit card issuer such as Visa®, MasterCard® or American Express® may include receipt insurance coverage as part of the cardholder contract agreement, or may charge an extra fee for receipt insurance coverage, or charge a receipt insurance premium on a per transaction basis only for those transaction which the cardholder selects, or collect a fee for a third party provider of the receipt insurance coverage to cardholders and the fee revenue subsequently split between the card issuer and the third party provider of receipt insurance. Alternatively, a bank may provide or issue receipt-insured-credit-cards either directly to cardholders or in conjunction with a card issuer such as Visa® or MasterCard® and the bank or a bank-owned entity or related entity may also provide the corresponding receipt insurance coverage. In this sense, a single bank, or related bank entities or bank-owned entities may serve as the receipt-insured-credit-card issuer and the receipt insurer, as further described herein.

Business Models

The receipt insurance systems and methods of the disclosure can be implemented by an independent third party receipt insurer, who stands as an intermediary between a two-party transaction to protect the interests and rights of the consumer in connection with a purchase, as schematically shown in FIG. 1. A receipt insurer 2 agrees, by contractual agreements with a consumer/purchaser 4 and a retailer/seller 3 or personal property insurer, that the receipt insurer will pay for any losses which the consumer may incur with respect to a product purchased from a retailer or seller as a result of not having a printed paper receipt for the purchase of that product, or that an insurer of personal property, such as under a home owner or renter insurance policy, will provide loss coverage for personal property the ownership of which is proven by receipt records. As a result of having receipt insurance coverage for a particular purchase, the insured consumer is not required to maintain possession of a printed paper receipt 5 for that purchase, and has no risk of financial loss which could result from failure to maintain possession of a printed paper receipt. Similarly, for receiptless purchase transactions, receipt insurance covers the consumer against any financial loss which could result from loss of an electronic receipt record, regardless of which party looses the electronic receipt record.

The receipt insurance systems and methods of the invention maintain an electronic database of individual receipt records for retrieval if necessary. The electronic receipt records of the Receipt Insurance are accepted by agreement with participating sellers and retailers. In the event that an electronic receipt record is lost by the receipt insurance system, any loss to the consumer as a result is covered by the receipt insurer in accordance with the terms of the receipt insurance policy. Accordingly, the receipt insurance system facilitates the creation and storage of electronic receipts of purchase transactions between consumers and individual retailers, and provides certified or verified records of receipts upon request in place of paper receipts.

Figure 2:
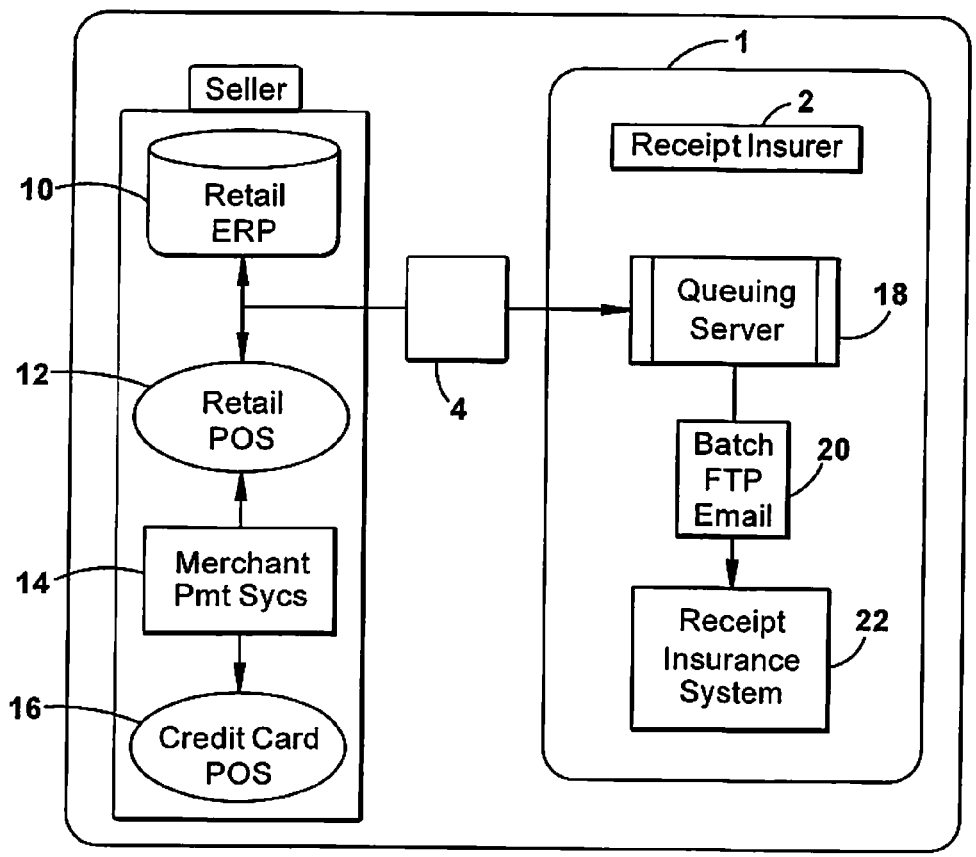
FIG. 2 is a flow chart describing one embodiment of the receipt insurance system and process of the present disclosure describing the flow of data between a retailer or vendor of goods or services and the receipt insurance system.

FIG. 2 schematically illustrates one embodiment of a receipt insurance system 1 of the disclosure in which a Receipt Insurer 2 provides insurance coverage to a consumer against the risk of losses or loss of rights resulting from the loss of a paper receipt from a seller. The Receipt insurance system and method interfaces in one of the described manners with a retail point-of-sale (POS) system and/or a retail enterprise resource planning (ERP) systems. One embodiment of a typical flow of sales transaction data in a retail environment uses a retail enterprise resource planning (ERP) system 10, a retail point-of-sale (POS) system 12, and optionally merchant payment services 14 and/or debit or credit card POS systems 16. The pertinent receipt or purchase transaction data is provided by a combination of the retail POS 12 and ERP 10 systems. The receipt insurance system 22 obtains this information by a data feed from the retailer to a queuing server 18 which is part of the receipt insurance system or platform. As used herein, the term "platform" is used to describe an operating environment under which various smaller application programs can be designed to run. The term "system" as used herein refers to a working combination of hardware, software and data communications devices which are configured and programmed with the described features to perform the described functions. The receipt insurance queuing server 18 collects all relevant information for each applicable transaction, for example transactions for which the consumer has agreed to have an electronic receipt generated and sent to the receipt insurance system 22 in lieu of a traditional paper receipt or which are covered under a blanket or standing agreement, for a period of hours, day or days, or any relevant time period, until such time as all the saved transaction information occurring during that time period is batched 20, for example as an ftp file or email, and sent to the receipt insurance system 22. Once the information has been sent from the queuing server 18 to the receipt insurance system 22, the receipt data is readily available for access by the receipt insurer, consumer or the retailer or other receipt insurance system partners as further described.

As used herein, the term "receipt insurer" refers to and means a person, party, entity or corporate entity that agrees, according to the terms of a binding insurance coverage contract with an insured, such as a consumer of a product, to pay money or provide some other benefit to the insured consumer in the event of a covered loss, such as the loss or destruction of a product purchase receipt, whether in paper or electronic form. In one embodiment of the present invention, the receipt insurer also enters into an agreement with one or more retailers to provide the receipt insurance service to consumers by agreement with the consumer that the receipt insurer will cover any losses or loss of rights the consumer may have as a result of not having possession of a paper receipt from a seller/retailer, either because the consumer elected not to receive a printed paper receipt from the seller as an option at the point of sale, or as a result of loss or destruction of the original paper receipt which the seller requires for product returns, exchanges or warranty claims. The functionality of the system and method is based upon the agreements between the receipt insurer and the seller/retailer and the consumer. The agreement between the receipt insurer and retailer/seller establishes that the retailer will accept the receipt insurer's electronic record of an receipt insured transaction as an authentic and verified record of the transaction, treated contractually and legally as an exact equivalent of the retailer/seller's original paper receipt produced at the retailer/seller POS. The agreement between the receipt insurer and consumer is a promise by the receipt insurer to cover, for example, any and all losses or loss of rights resulting from the absence of a paper receipt from the retailer/seller for any covered sales transaction. The lack of a receipt may be intentional, as in the case of an electronic receipt option offered by the retailer in lieu of a paper receipt, or unintentional as in the case of loss or destruction of the original paper receipt, but may be immaterial under the terms of the policy coverage. The receipt insurance agreement, or policy terms and conditions, may include but not be limited to: duration, premium amounts, limits of claim coverage, deductibles or expenses, claims submission requirements and process, participating retailers, exclusions, compliance with federal and state laws and regulations, privacy protection, etc.

In one embodiment of the receipt insurance systems and methods, an electronic record of all or selected sales transactions is acquired by a queing server which is interfaced with a retail ERP, as shown in FIG. 2. This hardware and software interface has many advantages given that the information required to generate an electronic record of sales transaction is created by and originally resides with the retailer. The retail infrastructure provides an additional benefit because retail systems, such as the POS and ERP systems, can be easily interfaced with and configured to accommodate the data feed of receipt information to the receipt insurance system. The retailer also has direct access to the customer to make them aware of the availability of receipt insurance, educate them on the benefits, and offer it as an additional service or optional insurance product for all or any particular purchases, as further described. Most retailers already save consumer sales transaction data for a certain period of time, during which consumers may return or exchange an item without having to present a physical receipt. However, the receipt insurance system insures the safekeeping of customer receipts for a much longer period of time than retailers do, and provides assurance to participating consumers, i.e. the insureds, that they will receive all the benefits of physically retaining a paper receipt without actually having to do so, as a result of the assurance which the terms of the receipt insurance coverage policy the receipt insurer provides. The present disclosure includes the concept of coverage of a consumers losses resulting either from the loss of a paper receipt, and losses resulting from the loss of an electronic receipt, whether the electronic receipt, for example in the form of a digital file, is lost by the consumer or if lost by the receipt insurer. Examples of losses include, without limitation, inability to return or exchange a purchased product, inability to make a warranty claims to repair or replace a product, and inability to make a claim for person property loss or damage under a personal property or homeowner's insurance policy.

A retail partner may choose to offer receipt insurance as a value added service, in which case the retailer would directly compensate the receipt insurance provider for providing and performing the service. The receipt insurance system can serve as a fee-generating service that customers pay for on a per-transaction basis, on a one-time membership fee basis or combinations and variations thereof. In such cases, the receipt insurance provider and the retail partner could share in the fees generated by the service. A retailer agreement with the receipt insurance provider may be exclusive to one retailer or may be available to more than one retailer, or could be made available to a specified geographic territory, limited to sales of certain monetary transaction size or product categories, or not.

In another embodiment, the receipt insurance system can be implemented in cooperation with, or integrated with a credit card issuer such as Visa®, MasterCard® or American Express®, or other credit card or debit card issuers or banks. Since a significant portion of sales transactions, and particularly retail consumer sales transactions, involve payment with a credit card, credit card issuers can provide direct access to many potential receipt insurance customers and in connection with the credit card payment processing with retailers. In this embodiment, receipt insured customers are holders of receipt insurance-enabled credit cards or debit cards. Credit card companies may easily provide the customer receipt insurance enrollment and fee or premium collection and distribution functions within the existing credit card framework and related online services. It also eliminates the need for the receipt insurance system to generate unique customer identification numbers because the consumer's credit card account numbers can serve as the unique key for account delineation amongst receipt-insured customers. A credit card company may offer the receipt insurance services as an additional or integrated service to its customers/cardholders, and may charge a one-time, annual or other periodic receipt insurance fee or premium. Alternatively, a credit card issuer, bank or retailer may charge a per transaction receipt insurance fee or premium.

The agreement between the receipt insurer and a credit card company also requires the agreement of participating retailers, as the retailer is the only source of the detailed receipt information required to produce accurate electronic records of each purchase transaction. The receipt insurance agreement also covers integration of the receipt insurance components with retailer POS and/or ERP systems. All of the foregoing description with respect to credit cards is equally applicable to debit cards, which as known are bank or financial institution issued cards tied to an account from which purchases are debited against a cash balance. A credit card account which includes the receipt insurance service may include on a card holder's monthly statement a line item indicator for each purchase transaction whether or not that transaction is covered by receipt insurance, such as for example the abbreviation "RI" in the transaction description, thus indicating to the card holder that an original paper receipt for that transaction is not required by the retailer or seller for purposes of return, exchange or warranty claim in connection with the purchased merchandise. Additionally, the card holder's statement of card activity may further include a code, such as an alpha-numeric code or optical code or Internet address or hyperlink which provides access to the electronic receipt data which is maintained by the receipt insurer of the retailer or seller. The credit card enabled receipt insurance system and method may also be implemented through the use of personal "smart" devices which perform purchase transactions, such as smart cards, personal portable computers, cell phones or pre-programmed gift cards with magnetic or digital data that includes the receipt insurance coverage details described.

In yet another embodiment, the receipt insurance system is integrated with an ERP provider. The ERP provider is the full source of a significant portion of the software and hardware system which manages detailed retail data necessary to provide accurate electronic records of retail purchase transactions. The ERP system infrastructure may be easily configured to feed the necessary receipt information in electronic form to the receipt insurance system, in particular the receipt insurance system database which stores the insured electronic receipt records for later retrieval if required, all in accordance with the terms of the receipt insurance coverage. However, POS system data also requires data connection with retailers and the interaction between the receipt insurance system components and retail POS systems.

In still another embodiment, the receipt insurance system is integrated with a Merchant Payment Services Provider (MPSP) 14 or intermediary between cardholders and a card issuer such as Visa®, responsible for authorizing and classifying credit card purchases. Because a MPSP also has access to credit card account numbers and purchase transaction amounts, the receipt insurance premium or fee can also be processed with the purchase amount and the transaction imported to the receipt insurance system. Some additional information related to the purchase transaction, such as product details, may be separately acquired directly from the seller/retailer or by the MPSP.

Receipt Insurance Method

Receipt insurance can be offered to consumers on a per transaction basis, for example, a small service fee or premium charged per transaction such as for example $00.10 per transaction or a service fee based on the percentage of total purchase, for example one (1) percent or less of the item purchase amount or a total purchase amount. Charging a per transaction fee allows consumers to pick and choose which purchase transactions will be insured and memorialized by an electronic record of the transaction, saved and insured by the receipt insurance system. Consumers may not wish to have an electronic receipt generated and saved for small or insignificant purchase transactions. However, consumers are likely to prefer an electronic record of the transaction when the transaction involves high-priced or long-lasting items or items that have a warranty, or which will be covered under a personal property or homeowners insurance policy, such as jewelry, watches, artwork, electronics, etc. Alternatively, receipt insurance may be offered to consumers on a membership or blanket coverage basis, for example, a yearly service fee will provide the consumer with receipt insurance for each transaction made with participating retailers and for which a unique receipt insurance consumer number, i.e., unique insured number has been presented. This payment method allows for the inclusion of all consumer transactions at participating retailers.

The receipt insurance coverage of the present disclosure is established and governed by contracts and agreements with the involved parties. With respect to sellers or retailers, an agreement with the receipt insurance provider states in essence that the seller of an item of merchandise (or of a service) will accept, in those instances where the seller would otherwise require the buyer to produce an original or paper receipt, an electronic record of the receipt from the receipt insurer as a full legal equivalent to the original receipt which the seller issued. The agreements with sellers or retailers could be in the form of two party business contracts with customary terms and conditions which set forth the duties and obligations of the parties. With respect to the buyer or consumer, an agreement in the form of an insurance policy with the receipt insurer is a promise by the receipt insurer to cover and protect the insured consumer, e.g. in the form of payment, for any losses or loss of rights which the consumer incurs as a result of not having possession of an original receipt from the seller of a product or service which the consumer purchased. In one embodiment, these agreements or contracts with consumers could be set forth entirely on a website of the receipt insurance provider, configured to require a person wishing to acquire receipt insurance to read and "click-through" or otherwise agree to the terms of the receipt insurance coverage. A similar contract formation methodology can be used in connection with receipt insurance offered in connection with a credit or debit card. Paper copies of the policy terms can also be delivered to the insureds.

In another embodiment, receipt insurance coverage may be provided to consumers at no charge or zero premium. For example, all purchases made by the consumer at participating retailers will be captured electronically and saved in the receipt insurance system and covered by a receipt insurance policy. If the consumer requires retrieval and printed proof of the transaction, the receipt insurance system may charge a retrieval or printing fee for each requested transaction as a condition of coverage. This option may seem more economical to consumers because there is no cost to insure the proof of purchase data and payment is only necessary should retrieval be required. Another option is to provide the entire receipt insurance service at no cost to the consumer. This method requires that the receipt insurance agreements with different retailers, one or more credit card companies or other retail service providers to provide the service to consumers as a service in conjunction with the retail sales service and/or the payment service. In this embodiment, the receipt insurance provider would be compensated by the particular retail service provider that serves as a partner in providing the receipt insurance service to consumers. Retail service providers may choose to partner with the receipt insurer to provide receipt insurance to its customers, gain customer loyalty, and offer the insurance coverage as an added benefit to its customer base.

Insured Identification Number

Each customer that elects to acquire receipt insurance coverage may be assigned a unique customer identification number within the receipt insurance system. This number serves as the unique key that allows all electronic transaction data to be attributed to a particular customer in the receipt insurance system. A unique customer identification number is generated and assigned to each unique consumer on the occasion of either electing to have a first retail transaction receipt generated electronically and saved within the receipt insurance system, or by electing to obtain receipt insurance in any one of the ways described. The unique customer identification number can be printed on a card or key fob similar to a retail rewards card, wherein the consumer may present the card to a participating retailer to identify the consumer as a member of the receipt insurance system, or it can be encoded magnetically on a card, or programmed into memory of a digital device such as a smart card, computer, cell phone or other personal or portable digital device. A receipt insurance identification card may be swiped by a card reader or the customer identification number may otherwise be entered into the retail POS system or other peripheral receipt insurance-based system in order to relate the unique customer identification number to the retail transaction.

Another method of associating the unique customer identification number to a particular consumer is by agreement with a credit card company wherein the unique customer identification number is uniquely associated to the consumer's credit card number in the credit card issuer account system so that each time that particular credit card is used as a form of payment, an electronic receipt is generated and saved within the receipt insurance system. If the unique customer identification number is not tied to a credit card or other receipt insurance issued membership card, the consumer can alternatively give the retail cashier the unique number assigned by the receipt insurance system to be typed into the retail POS system or other peripheral receipt insurance based system at the time of purchase, or the consumer may be prompted to enter the number into a retailer provided keypad or signature capture device when entering other pertinent payment information. A consumer may also be issued a unique customer identification number by enrolling or purchasing receipt insurance on a receipt insurance system website or by entering a paper based receipt into a kiosk or automated receipt machine (ARM), methods further described below.

Receipt Insurance Process at Point of Sale

Once the consumer has been assigned a unique customer identification number, the consumer may begin taking advantage of the many benefits offered by the receipt insurance system such as, requesting an electronic receipt from participating retailers at physical stores or online via a receipt insurance website, converting traditional paper-based receipts to electronic receipts stored within the receipt insurance system via a kiosk or ARM, and viewing, sorting and retrieving stored electronic receipts, and submitting a claim to the receipt insurance system at any time for an electronic record of a receipt, the acceptance of which by the seller is insured by the receipt insurer.

Figure 3:
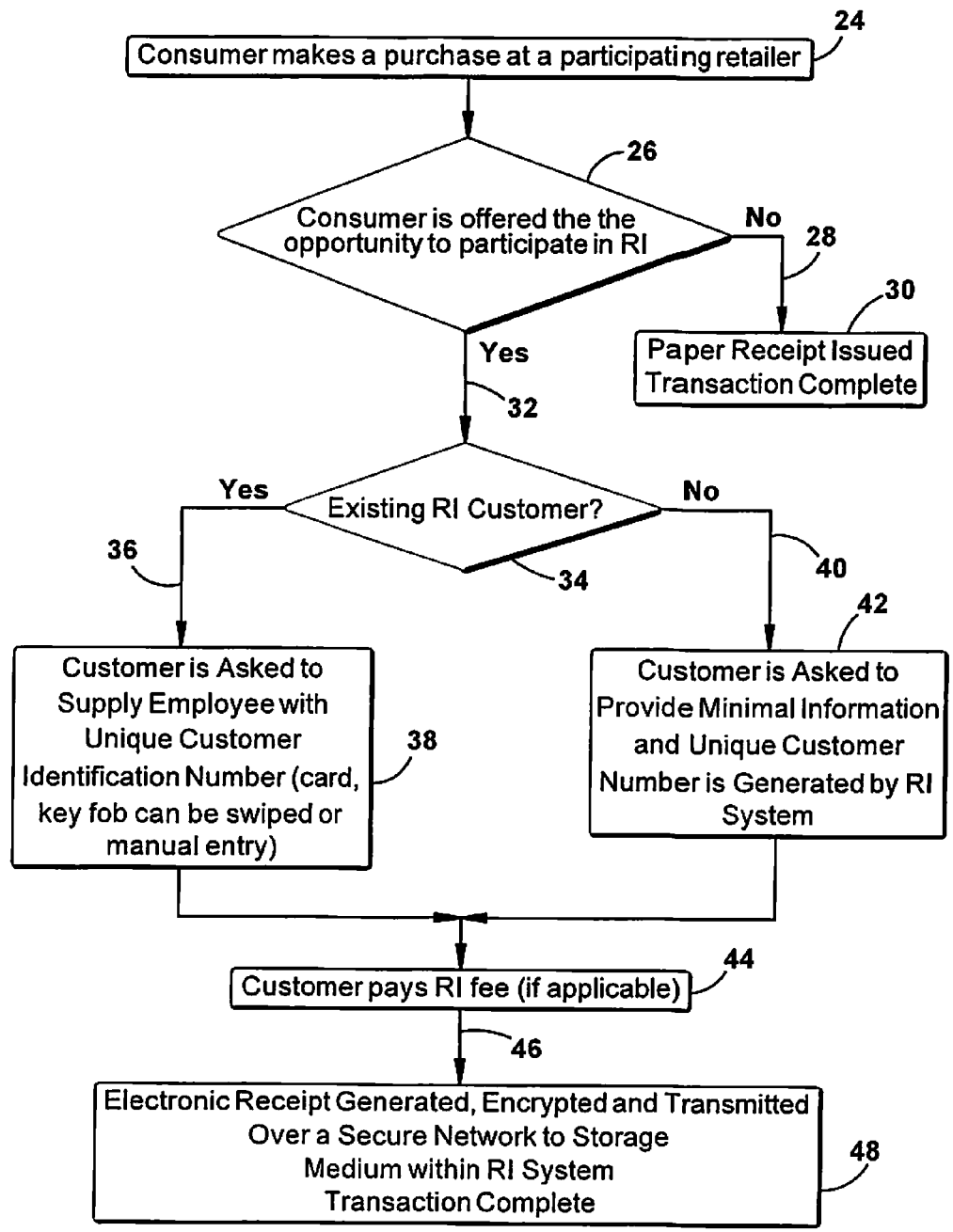
FIG. 3 is a flow chart of representative steps in the execution of one embodiment of the receipt insurance system and method of the present disclosure.

As is shown in the flow chart of FIG. 3, the process of obtaining an electronic receipt to be sent to and stored within the receipt insurance system from a participating retailer (physical store or online retail website) begins when a consumer makes a purchase, as indicated at reference numeral 24. A participating retailer may be any retailer that has partnered with or otherwise agreed to the legal terms of the third party receipt insurance coverage system, and establishes a data interface between its sales transaction management system and the receipt insurance system. Terms of the retailer agreement with the receipt insurer include payment methods which may include: consumers being charged a per transaction or a percentage of each purchase amount; consumers being charged a one-time flat membership fee; consumers being charged no initial fee but a fee for each receipt retrieval; or retailers providing the service at no cost to the consumer. In each case, the agreement will include what percentage of the consumer fees collected will go to the receipt insurer and what percentage will go to the retailer and/or to a payment systems provider such as Visa® or MasterCard®. If the retailer is offering the receipt insurance service as an included or value-added service and charges no fees to the consumer, then the agreement will include an alternative compensatory arrangement by which the retailer compensates the receipt insurer for providing the service to its customers. A retail cashier may offer to sell or provide receipt insurance to each customer during each sales transaction 26. For example, at the point of sale a customer may be asked, prior to machine generation of a paper receipt, whether he or she wishes to purchase for a small fee (or no fee at all) receipt insurance for the current transaction. Retailers can encourage and promote the use of receipt insurance for the customer's convenience and advantage and because the retailer may realize additional income from the transaction or induce customer loyalty. An electronic cash register may be programmed to remind the live cashier to offer receipt insurance to the customer.

If the consumer declines receipt insurance at the point of sale 28, a conventional paper receipt is generated and given to the customer upon completion of the transaction 30. In this respect, the receipt insurance system and method can easily co-exist in the same retail operation with conventional paper receipt transaction processing. If the consumer agrees to accept or acquire receipt insurance coverage at 32, the consumer may be asked by the live cashier if he/she is an existing receipt insurance customer at step 34. If the consumer is an existing receipt insurance customer 36, he/she must present his/her unique customer identification number 38 prior to completion of the sales transaction in order for the purchase to be covered. This can be performed in a variety of ways. For example, in one embodiment, the user may present a receipt insurance card or other digital data carrying device which contains the consumer's unique customer identification number. The card may be swiped through a card reader or any other data exchange system. In another embodiment, the user or cashier may manually enter the consumer's unique customer identification number into the retail POS or receipt insurance based system so that the purchase data is matched with the unique customer identification number. In yet another embodiment, the consumer's unique customer identification number may be tied to the consumer's credit card or other payment device which automatically relates the purchase transaction data to the particular consumer within the receipt insurance system. If the consumer is not an existing receipt insurance customer 40 (or "insured") and therefore does not have a unique customer identification number, then the cashier may have instructions to prompt the consumer for a small amount of personal information such as name, address and telephone number at the point of sale, wherein the consumer's unique customer identification number may be generated 42.

After the sales transaction is completed and the consumer has agreed to accept receipt insurance and paid the receipt insurance service fee or premium (if applicable) 44, an electronic record of the transaction in the form of an electronic receipt is generated, optionally encrypted, and sent at step 46 over a secure network to a storage device within or associated with the receipt insurance system 48. In one embodiment, the encrypted electronic receipt is staged in a queuing server and batched until the end of the day or another period of time, when all electronic receipt data is sent to a permanent storage device within or associated with the receipt insurance system. The queuing server may be located at the point of sale or at a remote, off-site location. In one embodiment, the data may be pushed in real time directly to permanent storage within the receipt insurance system. Once the information reaches the permanent storage device, it is available for retrieval and certification for future use, as further described herein.

Figure 4:
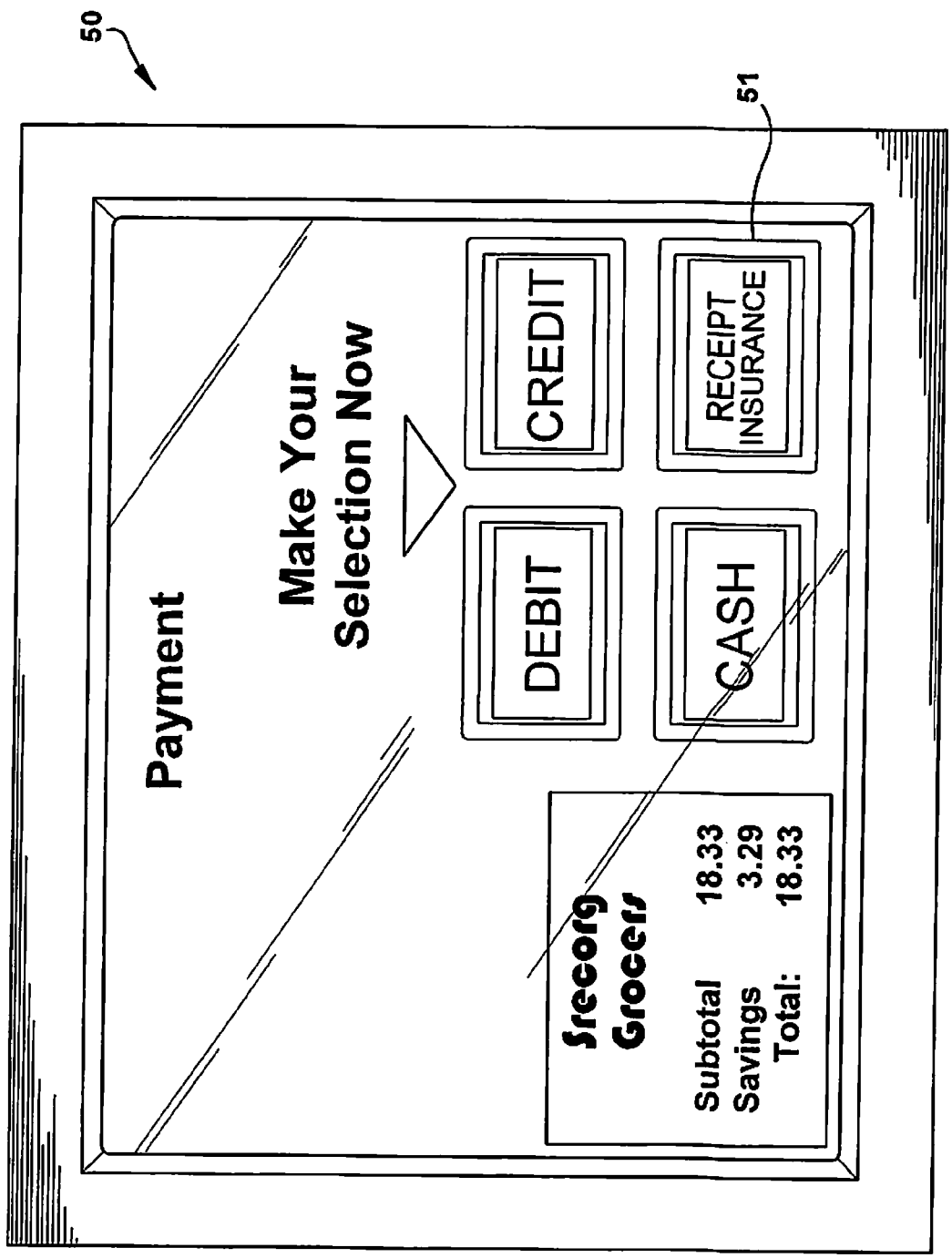
FIG. 4 is a representative screen display of an automated sales transaction machine which includes receipt insurance as a component of a sales transaction.

For automated checkout systems, the offer of receipt insurance can be programmed into the card wedge or signature capture device as a YES/NO screen which the customer must click or tap through. The screen may appear after the consumer has finished scanning all his/her items and is preparing to tender payment. A representative selection screen 50 is shown in FIG. 4. When the user selects the 'Receipt Insurance' option 51, a second screen may appear requesting the consumer's unique customer identification number in the receipt insurance system. If the consumer is an existing receipt insurance customer, he/she can manually enter his/her unique customer identification number and proceed to tender payment. If the consumer is not an existing receipt insurance customer, he/she may indicate that on the screen and may be taken to a third screen on which he/she may enter a small amount of personal information, such as name, address and telephone number. A unique customer identification number will be generated by the receipt insurance system. At that point, the receipt insurance service fee or premium (if applicable) will be added to the consumer's total bill and the consumer can proceed with the checkout sequence of the automated checkout machine to complete the purchase transaction. The automated checkout machine may be configured to issue a paper receipt even if receipt insurance is acquired.

Acquiring Receipt Insurance Coverage after Purchase

Figure 5:
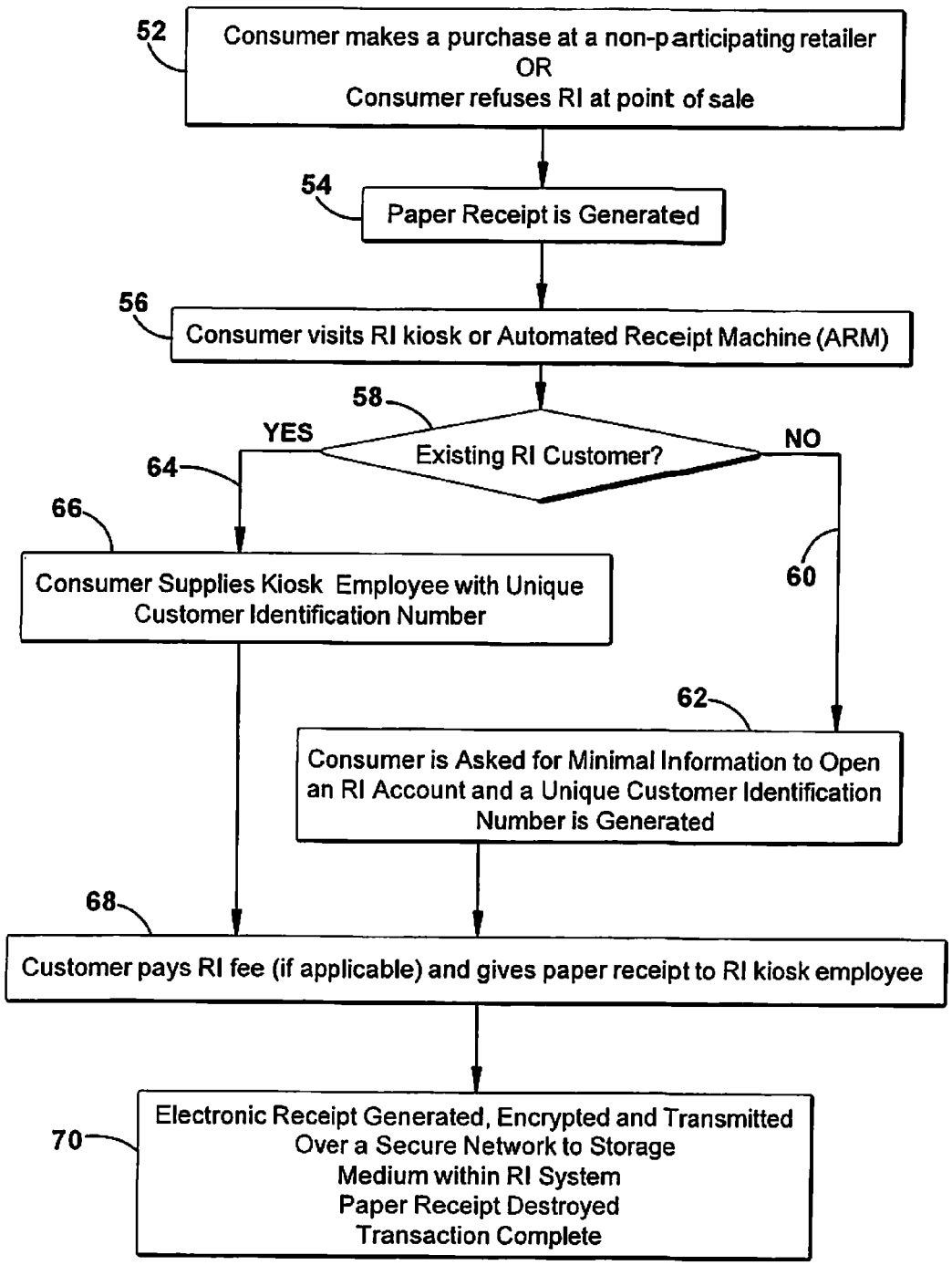
FIG. 5 is a flow chart of an alternate embodiment of a receipt insurance system and method of the present disclosure.

The receipt insurance system is also capable of converting existing paper receipts into insured electronic receipts that are stored within the receipt insurance system as is described in the flow chart of FIG. 5. This may be necessary for old receipts, receipts from non-participating retailers or receipts from participating retailers where the consumer declined receipt insurance at the point of sale 52. A consumer can securely create an electronic receipt within the receipt insurance system, from a paper receipt, by the use of a kiosk, an Automated Receipt Machine (ARM), or other such manned or unmanned facility or device. As used herein, the term kiosk includes but is not limited to a manned service station which provides assistance to consumers for using a scanner or other such device that is configured to receive a paper receipt (or to receive information from a paper receipt) and to create an electronic receipt for use in the receipt insurance system. Similarly, the term "ARM" refers to an unmanned self-serve machine or station, similar to an Automated Teller Machine (ATM), that is capable of receiving a paper receipt (or to receive information from a paper receipt) and to create an electronic receipt therefrom for use in the receipt insurance system. This invention is not limited to a dedicated freestanding kiosk or ARM, but can be practiced by any suitably configured hardware/software combination capable of collecting the necessary information from a paper receipt and creating an electronic record thereof, which can be verified as an accurate sales transaction record. For example, any suitable scanning or character recognition device can be used to create a data file which is transferable to and verifiable by the receipt insurance system. Also, this procedure can be practiced by any terminal or device such as a personal computer or digital scanner which can otherwise receive input of information from a receipt and create an electronic receipt for use by the receipt insurance system, such as, for example, an internet website configured for use by a consumer with defined fields for inputting information from a receipt, including date, time, list of items purchased and corresponding purchase prices, and any unique transaction numbers or codes (which may or may not be associated with a graphic identifier such as a bar or block code), or which is capable of receiving graphic image files or optically scanned files or receipts.

If a consumer makes a purchase at a non-participating retailer or the consumer declines receipt insurance coverage at the point of sale 52, then a paper receipt is generated at 54. To convert that paper receipt into an electronic receipt which is generated by and stored within the receipt insurance system, the consumer must visit a receipt insurance kiosk or ARM 56, or enter the receipt information into the receipt insurance system over the Internet, for example by accessing the receipt insurance system website and transferring a digital file such as a .pdf or .jpeg formatted file. A link to a receipt insurance implementation site or page may also be provided on the corresponding retailer's website. A receipt insurance employee (in the case of the kiosk) or a user screen (in the case of the ARM) will inquire whether the user is already an existing receipt insurance customer 58. If the consumer is not an existing receipt insurance customer 60, then the kiosk employee or ARM user screen may prompt the user to provide a minimal amount of personal information, such as name, address and telephone number at step 62. Once this information is obtained, a unique customer identification number is generated at step 62. If the consumer is an existing receipt insurance customer 64, then he/she will be prompted to provide his/her unique customer identification number at step 66. The consumer must present his/her unique customer identification number to the kiosk employee or must enter it into the ARM. Fees (if any) for generating an electronic receipt from a paper receipt may be calculated and accepted by the manned or unmanned receipt insurance receipt stations 68. Payment methods may include cash, credit card, debit card, PayPal™ or any other commonly accepted electronic payment system. Once the consumer has tendered payment, an electronic receipt is generated, encrypted and transmitted to the RI system 70. The original paper receipt may be retained by the kiosk employee or ARM and may be shredded or otherwise destroyed at step 70. An advantage of the receipt insurance kiosk or terminal is that it can be used to put receipt insurance in place with participating retailers without direct involvement with the in-store checkout procedures of the retailers.

Receipt Insurance for Online Purchases

Receipts for online retail purchases may also be electronically generated by and saved within the receipt insurance system in connection with any type of online or Internet purchase system such as those used in connection with e-tailer websites over which goods are sold. In one embodiment as shown as an example in FIG. 6, the retail checkout or payment website of a participating online retailer through which receipt insurance is available will, on any particular screen of the checkout or payment processing, such as screen 71, contain a checkbox or hyperlink 72 or other graphical user interface that when selected, indicates the consumer's desire to acquire receipt insurance coverage for the purchase. There may also be an accompanying hyperlink or bubble 73 which contains an explanation of the details of receipt insurance coverage, and/or a link to a separate website of a receipt insurance provider, where the terms of coverage and a complete copy of the receipt insurance policy including all applicable terms and conditions is accessible and which may further require the consumer's agreement therewith, and further be configured to accept and process payment for receipt insurance coverage. When the receipt insurance option 72 is selected, the user may be prompted to enter his/her unique customer identification number in fields which appear. Again, if the user is not an existing receipt insurance customer, the consumer may be prompted to enter some personal identifying information such as name, address and telephone number. A unique customer identification number will be automatically generated upon the consumer providing such information. Where the consumer accepts receipt insurance, no paper copy of the original electronic receipt will be generated and delivered to the customer, either by e-mail, with the product shipment packaging or under separate cover. The checkbox 72 or user interface mechanism that offers receipt insurance can be conveniently located proximate to the other payment related information located on the page, such as credit card information and billing information. The receipt insurance fees (if any) will be calculated (either a flat fee or percentage of total purchase fee) and added to the total purchase price. A "receipt insurance" label or icon 74 located on the payment page can be hyperlinked to an explanation of the details of the receipt insurance service, including disclosure of the terms of coverage and any applicable fees or other details.

Process for Retrieval of an Insured Receipt Record

Once an electronic receipt has been generated and processed so that it resides on a long term storage device within the receipt insurance system, it is available for retrieval and use as required, for example to honor any claims which a consumer might make for purposes of a product return, replacement or repair. There are several methods by which a consumer may retrieve receipt information from the receipt insurance system. In one embodiment, a consumer wishing to return, exchange, or make a warranty claim on a product purchased from a participating retailer can simply take the item to the participating retailer and present his/her unique customer identification number and perhaps some information identifying the product such as an SKU number or the date of purchase. A store employee can enter the consumer's unique identification number into the receipt insurance system and electronically view and/or retrieve the electronic record of the item purchased. In this scenario, there is never a need to actually print out a paper version of the electronic receipt. This method simplifies the return, exchange or warranty claim processing, or reimbursement or tax reporting, while saving time and the cost of receipt paper and printer ink. In another embodiment, the consumer wishing to return, exchange or claim rights under a product warranty to a non-participating retailer or manufacturer, can login to a secure receipt insurance website by entering his/her unique customer identification number, locate the appropriate receipt record and print a paper copy of the receipt that can be taken directly to or emailed to the non-participating retailer or manufacturer. In still another embodiment, a consumer that does not have access to a computer or printing device can visit a local kiosk or ARM, enter his/her unique customer identification number (or provide it to a kiosk employee), locate the appropriate receipt record (by searching or providing some item identifying information such as a SKU number or date of purchase), and request a printout of the appropriate receipt record.

Receipts printed from the receipt insurance system may contain a particular bar or other scan code, certification number, digital certification, or other specific insignia designated by the receipt insurance system which indicates that the receipt is a valid electronic record of a receipt and/or a certified copy of a receipt which is insured by the receipt insurer.

Receipt Insurance Website

As referenced previously in this disclosure, the receipt insurance system may further include a website that is configured to enroll new customers, i.e., to put receipt insurance coverage in place, to provide existing customers with entry and retrieval of electronic receipts along with searching, sorting and organization methods, and the ability to email receipts and/or gift receipts to interested third parties, and to submit and process claims for receipt insurance coverage. A consumer wishing to acquire receipt insurance and enroll in the receipt insurance system can visit the receipt insurance website and enter required information that may include for example name, address, telephone number and optionally credit card or other electronic payment information and the names of retailers. Also, the receipt insurance website may list all of the participating retailers. Once the user has entered the required information, the receipt insurance system will generate a unique customer identification number for the consumer and set up a customer account within the receipt website. A membership card or key fob with the customer's identification number may be produced and mailed to the customer. As noted, consumers can alternately enroll in the receipt insurance system at the point of sale (by a live cashier), via a printed form that can be mailed to a receipt insurance administrator, or where the receipt insurance service is offered in connection with a credit card company, the consumer may acquire receipt insurance protection by visiting the credit card company website or completing a form that is returned to the credit card company, or directly to a receipt insurance administrator.

An existing receipt insurance customer requiring a printed version of a saved electronic receipt can search through his/her saved receipts for the appropriate record. Search parameters may include, but are not limited to, date of purchase, place of purchase, purchase price, payment method, and SKU number or description of a purchased item. Once the appropriate electronic receipt record has been located, the user may (depending on the business model) have to pay a retrieval fee before the receipt is available for download or printing. Payment can be made online using any commonly accepted electronic payment method. Once the retrieval fee has been paid, the receipt is unencrypted and formatted for printing, downloading or emailing.

In addition to locating receipts for printing or emailing purposes, receipt insurance customers can also sort and organize receipts in a variety of ways. For example, customer's may sort receipts into dedicated folders which correspond to, for example, a specific retailer, the type or category of products purchased (e.g., clothing, house wares, electronics, etc.), the total amount spent, or by the time period (e.g., week, month, year, etc.) in which the items were purchased. Once the receipts have been sorted into separate folders or categories, the system may allow the user to total the dollar amount spent in each category or total the number of items in each category. This provides the user with an opportunity to analyze spending habits and budgeting issues.

Receipt insurance customers can also forward saved electronic receipts via email to interested third parties. This feature may save the user from having to print out a paper copy of the receipt. For example, a receipt may be emailed to the manufacturer of a product to show that the consumer is entitled to a warranty claim. Also, if the consumer purchases an item that will be presented as a gift and the receipt was electronically generated and stored within the RI system, the consumer may simply locate the receipt, indicate that a gift receipt is required, and provide the email address of the gift recipient. The system will remove all pricing information before emailing the electronic receipt to the gift recipient. The consumer may also indicate a date on which the consumer would like the gift receipt sent to the gift recipient. If the gift recipient does not need to return or exchange the gifted item, then the receipt never has to be printed in paper form. Depending on the business model, a retrieval fee may be required for retrieving and emailing a copy of a gift or other receipt to a third party.

Receipt Insurance System Components

Data communication exist between the receipt insurance system and several remote computer systems, namely, retail POS systems (and potentially retail ERP systems), consumer devices, which may include personal computers, personal digital assistants (PDA), cell phones, smart phones, smart card, and handheld computers, and the receipt insurance kiosk systems and the described automated receipt insurance machine (ARIM) which accepts and reads a paper receipt and issues a receipt insurance policy thereon, and accepts payment for the insurance policy premium. The hardware and software components of the receipt insurance system may vary depending on the business model selected. For example, if receipt is offered in connection with a retailer, a credit card company or other third party retail service provider, one or more components of the existing infrastructure of the partner may be used to implement the receipt insurance system. Components of the receipt insurance system may include one or more client devices, one or more application servers, one or more queuing servers, one or more database servers, one or more web servers, one or more relational databases or other large data storage device, a web portal, and one or more communication technologies such as for example various I/O devices and other related peripherals, public or private networks, both wired and wireless, local area networks (LAN) and/or wide area networks (WAN). Software will also be installed on the receipt insurance services and platform servers, the retail point of sale systems, and the receipt insurance kiosk or ARM.

The receipt data and customer information stored within the receipt insurance system may be stored in a relational database or other large data storage device. This storage device will contain all receipt data and may also contain personal customer information such as name, address and telephone number. The key that links the customer information with the corresponding customer data is the unique customer identification number. The receipt and customer data stored within the receipt insurance system is encrypted for security purposes.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Other features and aspects of this invention will be appreciated by those skilled in the art upon reading and comprehending this disclosure. Such features, aspects, and expected variations and modifications of the reported results and examples are clearly within the scope of the invention where the invention is limited solely by the scope of the following claims.

In further embodiments of the systems and methods of the disclosure, receipt insurance coverage can be put into place in connection with all types of consumer transactions and consumer transaction mediums, including but not limited to online transactions over the World Wide Web via the transaction servers of websites of online retailers such as for example www.amazon.com. When receipt insurance is offered by a seller such as an online retailer, the sale of receipt insurance coverage or policy can be accomplished in connection with the "checkout" process where the purchaser inputs necessary information such as name, address, credit card or other electronic payment instructions and data. A separate button icon suitably labeled such as "e-receipt", "receipt insurance", "insured receipt" or the like and a hyperlink to further explanation of the terms and conditions of receipt insurance coverage, and a complete online copy of a receipt insurance policy. As further shown in FIG. 8, receipt insured transactions can be identified and accessed in online statements 80 by a receipt insurance icon or symbol such as "RI" which both identifies the transaction as being covered by receipt insurance, and which may provide a hyperlink to further details about the transaction and/or terms of the receipt insurance coverage, such as for retrieval of the corresponding electronic receipt information for any purpose, access to the receipt insurance policy and/or a hyperlink to the websites of the retailer or the receipt insurer to access this and other information.

The receipt insurance system and methods of the disclosure work equally well in connection with wireless transactions over the internet and the World Wide Web. For example, the described receipt insurance offering and implementation in connection with any website can also be carried out with any wireless or mobile device with connection to the internet. Even where a screen display of an online retail website for a mobile device is different or modified from a full version of the website, receipt insurance can still be easily offered and implemented by use of buttons, icons or click-through and corresponding links. With e-mail confirmation of a transaction and corresponding receipt insurance coverage, receipt of such confirmation by the wireless device by which the transaction was made is also enabled, as further described. Also, wireless purchase transactions such as by a "digital wallet" device which carries payment account information which can be wirelessly read by a point-of-sale terminal, can be coded or programmed to invoke receipt insurance coverage in connection with the payment account. For example, in the case of a Visa or MasterCard account which has receipt insurance coverage as an aspect of the account agreement, as further described below, and which is encoded on a wireless device such as a smart phone, the performance of a purchase transaction with that device automatically puts into place the receipt insurance coverage for that purchase transaction, without any additional input by the purchaser or retailer.

Wireless Device Receipt Display

Figure 7:
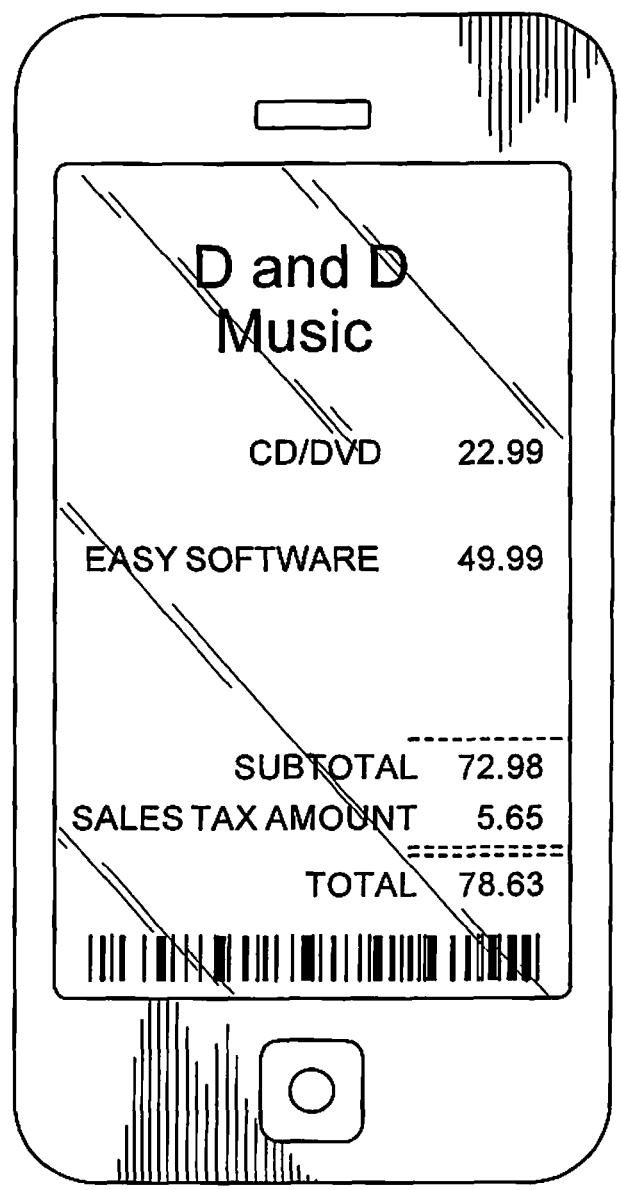
FIG. 7 is a diagrammatic view of a wireless digital device with a display.

Further in accordance with the systems and methods of the present disclosure, retail POS system such as in-store POS terminals and online retail systems (websites) are configured to transmit to wireless devices transaction receipts in any form and including complete or partial facsimiles of paper receipts such as produced by printers connected to POS terminals or cash registers. As shown in FIG. 7, the transmitted and displayed image of the receipt can be formatted and oriented to optimally fit on a generally oblong or rectangular display 77 of a wireless device 78 such as for example the Apple "iPhone" or Samsung "Droid" brand products or similar devices. The displayed receipt is preferably an exact facsimile or copy of a printed version, including the store name and logo, bar codes or Q codes or other codes, and all other transaction information. When the length of the displayed receipt exceeds the length of the display, a scroll function in the receipt display application allows the user to scroll through the entire length of the display by control of the wireless device display, such as by touch screen control. Other display features such as zoom in/out are also operative on the receipt display. The receipt display application also functions to effect management and storage of the receipt image which has been transmitted to and displayed by a wireless device. One operation is to store the receipt image in the memory of the wireless device. Another operation is to transmit the display receipt image to a remote destination, such as to an e-mail account, a bookkeeping program such as Quicken or Mint, or to a third party website and associated data storage server such as may be maintained by a receipt insurance provider or payment systems provider. These save and transmit functions can be prompted and effected by command buttons which are displayed with the receipt or subsequent to transmission and display of the receipt. The storage or transmit destinations may be pre-defined or prompted for entry, and programmed or programmable into the application, to for example generate pop-up controls as part of the receipt display for save, delete, store and send operations.

The described wireless transactions with receipt transmission and display to wireless devices are in connection with receipt insurance, wherein the digital receipts are insured by a third party insurer, or by a payment systems provider such as a credit or debit card issuer or bank or other financial institution, to function the same as and preserve all rights associated with a printed paper receipt. For example, a digital receipt as received and displayed on a wireless device as described, is fully accepted by agreement with the issuing retailer or seller, to provide all the attendant consumer rights such as proof of purchase, returns, exchanges, rebates, warranty claims for replacement or repair, loyalty points, etc.

In an alternate embodiment of the method of receipt insurance, a consumer purchase transaction may be insured with respect to a consumer's rights with respect to the possession of a receipt for a particular transaction by a payment systems provider such as a credit card or debit card issuer or bank. For example, a credit card issuer such as American Express, Visa or MasterCard, or any bank or other financial or credit extension business, may as a term of the credit account agreement, insure or otherwise cover the cardholder (e.g., account holder) against losses resulting from the lack of a physical receipt or even an electronic record of a receipt for a particular purchase transaction, subject to the terms and conditions of an insurance policy which is part of the cardholder agreement. A credit card associated with the described receipt insurance is referred to herein as a "receipt-insured-credit-card", and includes and is not limited to convention plastic cards with corresponding account numbers for credit accounts, debit accounts and combinations thereof regardless of the type of cash or credit accounts from which credit or cash is drawn or debited for purchases, smart cards or any other devices encoded or programmed in any manner with account information.

Figure 9:
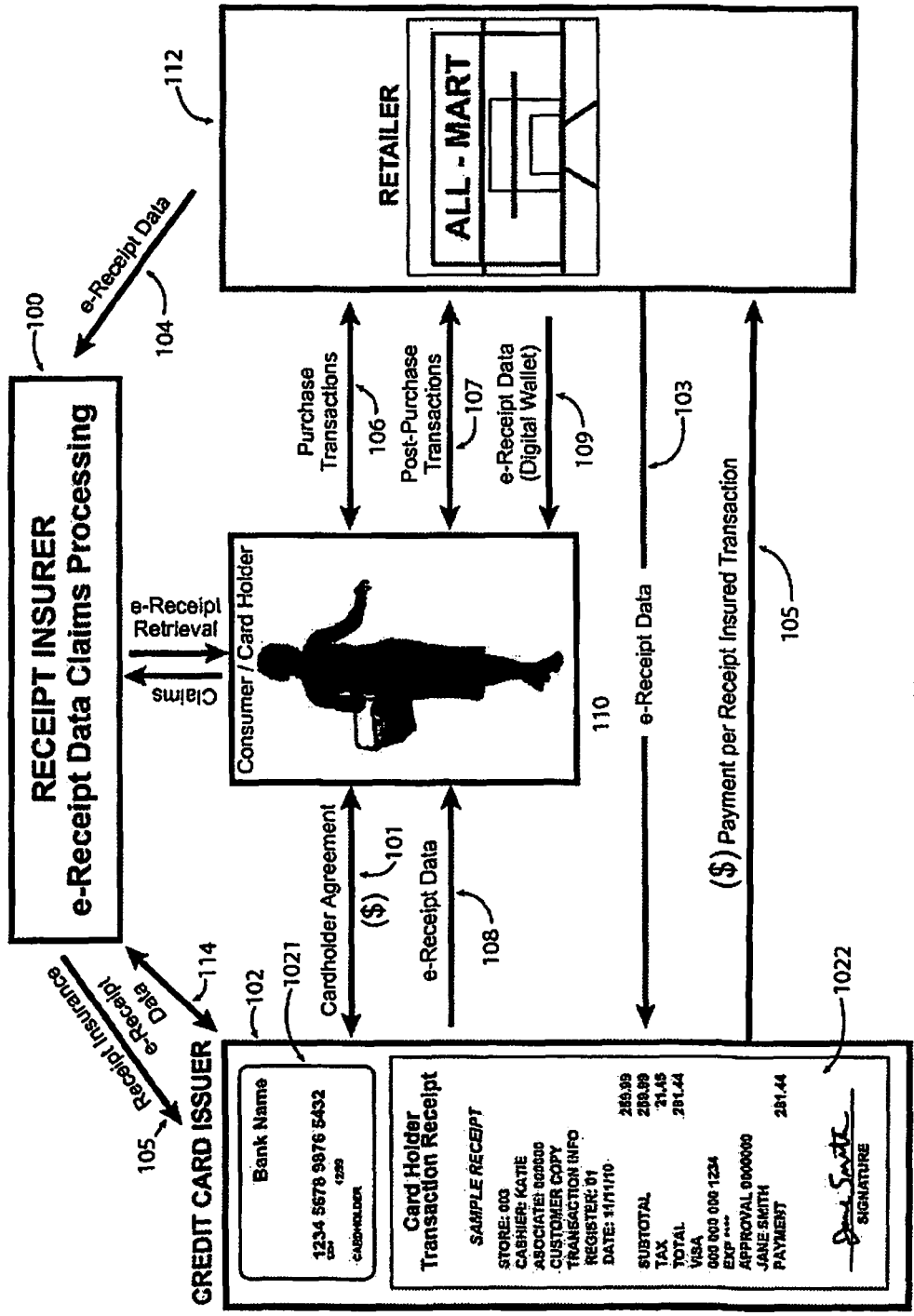
FIG. 9 is a diagram of a representative embodiment of a receipt-insured-credit-card system and method.

With reference to FIG. 9, a Receipt Insurer 100 establishes by agreement Receipt Insurance 105, i.e. an agreement to cover losses incurred by a consumer which may result from failure to possess a physical receipt or other proof of purchase in connection with a purchase transaction, with a Credit Card Issuer 102, under which losses or loss of rights which may be incurred by the consumer/cardholder 110 in connection with a purchase from a retailer 112 made with a receipt-insured-credit-card 1021, and which may be related to the absence of a physical or paper receipt, are covered under the terms of the policy. The credit card issuer 102 refers to either a bank or other financial institution, a credit card company such as American Express®, or a credit card payment systems provider such as Visa® or MasterCard® in conjunction with a bank. The receipt insurance coverage is preferably made a part of the cardholder agreement indicated at 101 for a receipt-insured-credit-card or receipt-insured account shown at 1021 between the Credit Card Issuer 102 and the Credit Card Holder 110. The cost of the insurance coverage to the consumer, or in other words the "insurance premium" can be incorporated into the cost of the credit card issuance under the cardholder agreement 101, or as an additional cost or surcharge. In other words, the cost of the receipt insurance may be borne entirely by the credit card issuer, entirely by the credit card holder, or divided between the two. When the consumer/cardholder 110 pays a fee or other consideration to the credit card issuer 102 for the receipt insurance service, the credit card issuer 102, which as noted may be a bank or credit card company, receives an economic benefit as a result as indicated by the symbol ($) on line 101, which may be in the form of retention or part or all of any fees paid by cardholders 110.

In accordance with the invention, there need not be an actual insurance agreement or policy either between the Receipt Insurer 100 and the Credit Card Issuer 102, or between the Credit Card Issuer 102 and the consumer/cardholder 110, but rather simply a contractual agreement by which the credit card issuer 102 and/or the retailer 112 agree to protect the consumer/cardholder 110 from losses which would otherwise result from failing to possess a receipt record, whether in paper or electronic form. To cover the cost of fulfilling such contractual promise to the consumer/cardholder 110, the Receipt Insurer 100 (or the Credit Card Issuer 102 or holding company thereof) may acquire business insurance, a bond or other form of guaranty or simply a commitment of capital from any source, such as for example a bond issuer, bank or other financial institution, insurer or re-insurer.

The receipt or receipt data, an example of which is shown at 1022, including the itemized listing of goods purchased and prices paid, credits, exchanges, taxes and total transaction amount and any other information provided by the retailer in connection with purchase transactions indicated at 106 can be captured and/or transferred in its entirety to the credit card issuer as indicated at 103 ("e-receipt data"), and/or to the consumer/cardholder at 109 (for example to a computer account or to a wireless device such as a wireless receiver with digital wallet function, and/or to the receipt insurer as indicated at 104 and 114 in electronic form for storage and later reference in the event of need for the receipt record, and/or to the receipt-insured-credit-card issuer at 103 for subsequent access by the cardholder at 108. Alternatively, the cardholder 110 may access receipt data directly from the receipt insurer 100. Once the complete electronic receipt record is received by either the credit card issuer 102 or the receipt insurer 100, the receipt insurance protection or guarantee can be carried out by agreement with the retailer to accept the electronic receipt record, which may be accessed by the cardholder from the card issuer at 108 or alternatively from the receipt insurer, for any purpose in connection with the purchase, including for example refunds, exchanges or warranty claims, indicated at 107 as "post-purchase transactions". In the event of a loss to the consumer/cardholder 110 as a result of loss of receipt data or failure to possess a physical receipt or other proof of purchase, claims can be made directly to the receipt insurer 100 by the consumer/cardholder 110 as indicated.

The receipt insurance system of the disclosure further includes revenue generating and transfer functions by which proceeds from insurance premiums associated with the cardholder agreement are collected by the credit card issuer and may be shared with or otherwise transferred to participating retailers or merchants. As explained, the credit card issuer 102 may receive an economic benefit in the form of fees or other charges for the receipt insurance service, either collected directly or indirectly from cardholders 110. Additionally and alternatively, the credit card issuer and/or the receipt insurer may pay the retailer/merchant or otherwise enter into a fee distribution or sharing agreement retailers/merchants as indicated at 105, for example in exchange for the acquisition of sufficient receipt data or e-receipt data 103 from the retailer/merchant on receipt-insured transactions, or as a form of revenue sharing of the premiums or other consideration paid by cardholders 110 for the receipt insurance coverage. In a preferred embodiment, the per-receipt payment to the retailer for each receipt-insured receipt information received is made by the credit card issuer 102 to the retailer 112, for example as a transaction fee credit, such as for example one-quarter of one percent reduction in the transaction fee charged for that transaction. This payment to the retailer 112 for the electronic record of a receipt-insured receipt compensates the retailer for honoring all of the consumer/cardholder's rights in connection with the transaction without the need for a physical paper receipt, and provides a financial incentive for the retailer to participate in the receipt insurance system, in addition to the cost savings to the retailer of not having to print a paper receipt for receipt insured transactions, i.e. transactions completed with receipt-insured-credit-cards.

The systems and methods thus disclosed provide, among other advantages and benefits, consumer protection against losses resulting from not possessing a physical receipt, fee generation for credit card issuers and retailers, elimination the of costs associated with printing paper receipts, and elimination of the requirement of physical possession of paper receipts for post-purchase transactions.

What is claimed is:

1. A computer implemented method of providing receipt insurance in connection with retail purchase transactions between consumers and retailers, the method comprising the steps of:
    displaying to a consumer on a display of a computer availability of receipt insurance from a receipt insurer by which a consumer is insured against loss related to a receipt for a purchase from a retailer;

the consumer selecting from the display to purchase receipt insurance from the receipt insurer and paying by a networked connection to the computer a receipt insurance premium to the receipt insurer;

the receipt insurer receiving by a networked connection to a point of sale terminal of a retailer a record of a receipt for a purchase by the consumer from the retailer which is insured by the receipt insurer, and the receipt insurer paying the retailer an amount based upon the receipt insurance premium paid by the consumer.

2. The computer implemented method of claim 1 further comprising the steps of:

displaying to the consumer availability of receipt insurance from a receipt insurer to insure a consumer against loss related to receipts for purchases from a plurality of retailers, and the receipt insurer paying a plurality of retailers an amount based upon the receipt insurance premium paid by the consumer.

3. The computer implemented method of claim 1 further comprising the step of:

the receipt insurer paying the retailer an amount based upon the receipt insurance premium paid by the consumer and per purchase by the consumer.

4. The computer implemented method of claim 1 further comprising the step of:

the consumer selecting from the display to purchase receipt insurance from the receipt insurer and paying by a networked connection to the computer a receipt insurance premium to the receipt insurer in connection with a consumer credit card account.

5. The computer implemented method of claim 1 wherein the consumers pay the premium to the receipt insurer for the receipt insurance for a period of time in which the purchases are to be provided with receipt insurance.

6. The computer implemented method of claim 1 further comprising the step of a consumer paying a premium or premiums for receipt insurance to an issuer of a credit card or debit card or to a custodian of an account by the networked computer connection to the programmed computer.

* * * * *